United States Patent
Yang et al.

(10) Patent No.: US 9,877,158 B2
(45) Date of Patent: Jan. 23, 2018

(54) WI-FI SCAN SCHEDULING AND POWER ADAPTATION FOR LOW-POWER INDOOR LOCATION

(71) Applicant: Intel Corporation, Santa Clara, CA (US)

(72) Inventors: Lei Yang, Hillsboro, OR (US); Hongtao Xu, Portland, OR (US); Xue Yang, Arcadia, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/026,636

(22) PCT Filed: Dec. 20, 2013

(86) PCT No.: PCT/US2013/077132
§ 371 (c)(1),
(2) Date: Apr. 1, 2016

(87) PCT Pub. No.: WO2015/094360
PCT Pub. Date: Jun. 25, 2015

(65) Prior Publication Data
US 2016/0219408 A1    Jul. 28, 2016

(51) Int. Cl.
*H04W 24/00* (2009.01)
*H04W 4/02* (2009.01)
(Continued)

(52) U.S. Cl.
CPC .......... *H04W 4/023* (2013.01); *G01S 5/0221* (2013.01); *H04W 52/0241* (2013.01);
(Continued)

(58) Field of Classification Search
CPC ......... H04W 52/0245; H04W 52/0241; H04W 4/023; H04W 84/12; H04W 24/00;
(Continued)

(56) References Cited

U.S. PATENT DOCUMENTS

| | | | |
|---|---|---|---|
| 7,995,547 B1* | 8/2011 | Barratt | H04W 48/16 310/328 |
| 2006/0013179 A1* | 1/2006 | Yamane | H04W 72/02 370/338 |

(Continued)

FOREIGN PATENT DOCUMENTS

| CN | 106171012 A | 11/2016 |
|---|---|---|
| KR | 1020090034551 A | 4/2009 |

(Continued)

OTHER PUBLICATIONS

"International Application Serial No. PCT/US2013/077132, International Search Report dated Sep. 24, 2014", 3 pgs.

(Continued)

*Primary Examiner* — Mong-Thuy Tran
(74) *Attorney, Agent, or Firm* — Schwegman Lundberg & Woessner, P.A.

(57) ABSTRACT

Embodiments of a mobile station and method for Wi-Fi scan scheduling and power adaption for low-power indoor location are generally described herein. In some embodiments, the mobile station may identify channels, beacon timing and rough signal strength levels of nearby access points (APs) from at least one of a previous full-channel scan or a Wi-Fi fingerprint database and may configure receiver sensitivity based on the rough signal strength levels for receipt of subsequent beacons. The mobile station may wake-up from a low-power state to receive beacons for the nearby access points on the identified channels at times based on the identified beacon timing. The received signal strength indicators (RSSIs) levels of the received beacons may be used for location determination.

17 Claims, 3 Drawing Sheets

(51) Int. Cl.
H04W 52/02 (2009.01)
G01S 5/02 (2010.01)
G01S 5/14 (2006.01)
H04W 84/12 (2009.01)

(52) U.S. Cl.
CPC ... H04W 52/0245 (2013.01); H04W 52/0248 (2013.01); G01S 5/0252 (2013.01); G01S 5/14 (2013.01); H04W 24/00 (2013.01); H04W 84/12 (2013.01); Y02B 60/50 (2013.01)

(58) Field of Classification Search
CPC .... H04W 52/0248; G01S 5/0221; G01S 5/14; Y02B 60/50
USPC .......................................... 455/456.6, 456.1
See application file for complete search history.

(56) References Cited

U.S. PATENT DOCUMENTS

| | | | | |
|---|---|---|---|---|
| 2006/0171304 | A1* | 8/2006 | Hill | H04W 88/08 370/228 |
| 2010/0109864 | A1* | 5/2010 | Haartsen | G01C 21/206 340/539.13 |
| 2010/0135178 | A1 | 6/2010 | Aggarwal et al. | |
| 2011/0264940 | A1* | 10/2011 | Lin | G01S 5/0252 713/324 |
| 2012/0028649 | A1 | 2/2012 | Gupta et al. | |
| 2012/0063340 | A1* | 3/2012 | Waters | G01S 5/0242 370/252 |
| 2013/0059609 | A1* | 3/2013 | Raento | H04M 1/72572 455/456.6 |
| 2014/0087752 | A1* | 3/2014 | Zhu | H04W 24/00 455/456.1 |
| 2014/0141796 | A1* | 5/2014 | Marti | G01S 5/0252 455/456.1 |
| 2014/0235280 | A1* | 8/2014 | Edge | H04W 48/16 455/456.6 |
| 2015/0011196 | A1* | 1/2015 | Jayakumar | H04W 4/028 455/418 |
| 2015/0098392 | A1* | 4/2015 | Homchaudhuri | H04W 48/20 370/329 |
| 2015/0146627 | A1* | 5/2015 | Ananda | H04W 48/16 370/329 |

FOREIGN PATENT DOCUMENTS

| | | |
|---|---|---|
| KR | 1020110035989 A | 4/2011 |
| KR | WO-2015094360 A1 | 6/2015 |

OTHER PUBLICATIONS

"International Application Serial No. PCT/US2013/077132, Written Opinion dated Sep. 24, 2014", 5 pgs.

"International Application Serial No. PCT/US2013/077132, International Preliminary Report on Patentability dated Jun. 30, 2016", 7 pgs.

\* cited by examiner

WI-FI SCAN SCHEDULING AND POWER ADAPTATION FOR LOW-POWER INDOOR LOCATION

This application is a U.S. National Stage Filing under 35 U.S.C. 371 from International Application No. PCT/US2013/077132, filed Dec. 20, 2013 and published in English as WO 2015/094360 on Jun. 25, 2015, which is incorporated herein by reference in its entirety.

TECHNICAL FIELD

Embodiments pertain to wireless networks. Some embodiments relate to wireless networks that operate in accordance with one of the IEEE 802.11 standards including, for example, the IEEE 802.11-2012 standards and the IEEE 802.11-2012 standards. Some embodiments relate to location determination. Some embodiments relate to indoor navigation.

BACKGROUND

With smart mobile devices becoming more prevalent, location sensing technology for these devices has become widespread. Outdoor location sensing is well-served by satellite-based location technology, but satellite signals are undependable indoors, so other location techniques must be used. A variety of indoor location techniques have been developed, most of them relying on determining the mobile device's position relative to other indoor devices whose positions are known. Such relative positioning is typically based on communicating with each of the other devices, and using either signal propagation times or received signal strength indicators to estimate the distance from each device. Triangulation can then be used to determine position in either two or three dimensions.

Because the mobile device may be moved to a new location, it may periodically communicate with the other devices to update its distance from those devices. That movement may also take it out of range of some of the current list of devices whose positions are known, and/or bring it into range of other devices whose positions may then become known. Both of these factors mean that the device periodically scans the relevant wireless channels. Current scanning techniques typically use the same algorithms that are used when searching for new network controllers. However, these algorithms are typically based on the assumption that it's desirable to find every reachable network controller, and that scanning will be done relatively infrequently. These consume too much power to be directly applied to frequent location sensing.

Thus there are general needs for wireless devices and methods for improved and more efficient scanning in wireless networks, including those that reduce power consumption.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
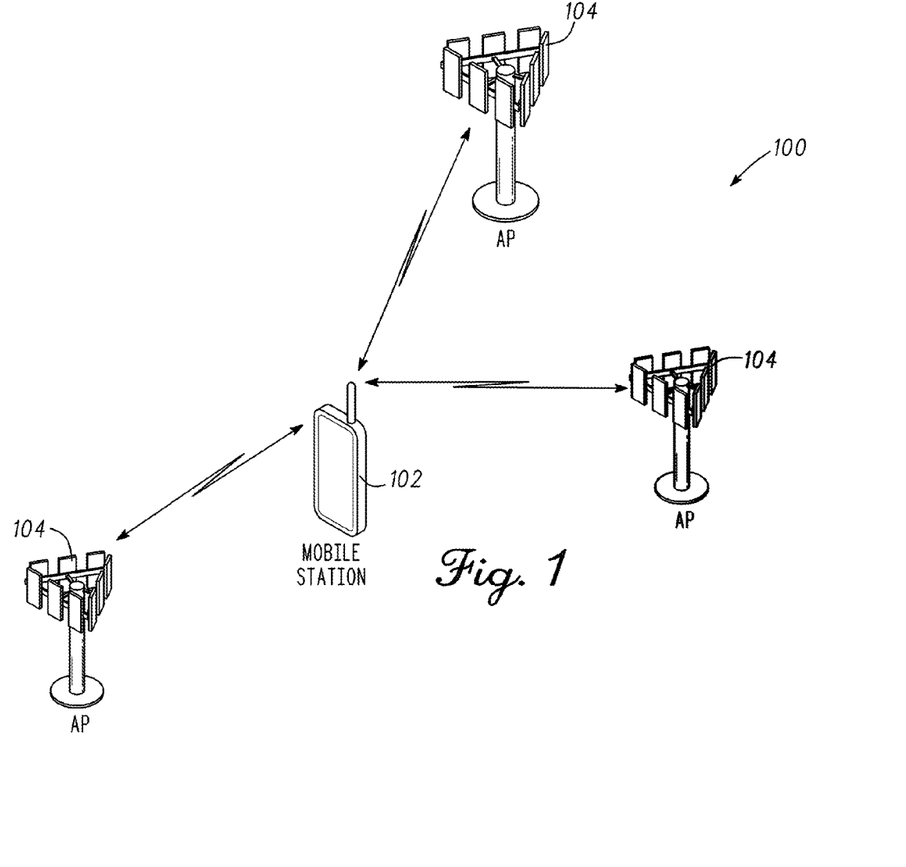
FIG. 1 is a functional diagram of a wireless network in accordance with some embodiments.

FIG. 1 is a functional diagram of a wireless network in accordance with some embodiments. Wireless network 100 may include a mobile station (STA) 102 and a plurality of access points (APs) 104. Wireless network 100 may be a Wi-Fi network that operates in accordance with one of the IEEE 802.11 standards including, for example, the IEEE 802.11n-2009 standards and the IEEE 802.11-2012 standards.

In accordance with embodiments, the mobile station 102 may be arranged to determine access points 104 for use for location references. In these embodiments, the mobile station 102 may be configured to identify channels, beacon timing and rough signal strength levels of nearby access points 104 from a previous full-channel scan, configure receiver sensitivity based on the rough signal strength levels, and wake-up from a low-power state to receive beacons for the nearby access points on the identified channels at times based on the identified beacon timing. The received beacons may be used for indoor location determination. These embodiments are described in more detail below.

With the recent explosion of smart mobile devices and location based services, reliable and accurate location sensing has become increasingly important. Given the proliferation of Wi-Fi networks, localization techniques utilizing Wi-Fi received signal strength indicator (RSSI) have been extensively studied. Energy-efficiency is one of the key requirements for location sensing on mobile devices to avoid major impact on battery-life. For Wi-Fi RSSI based location sensing techniques, the major power consumption comes from a Wi-Fi scan, where mobile devices identify nearby Wi-Fi access points (APs) and extract the RSSIs of the received Wi-Fi beacons for location estimation.

The existing mobile platforms only provide a standard Wi-Fi scanning function designed primarily for network discovery purposes. Such Wi-Fi scan function usually performs an exhaustive AP search that tries to identify all detectable Wi-Fi networks in vicinity, which usually involves significant power consumption (>100 mW) and delay (1 to 5 seconds). While this traditional Wi-Fi scan is acceptable for infrequent network discovery (e.g., once every 60 seconds), location sensing, however, usually requires much more frequent Wi-Fi scan (e.g., 1 location fix every second) to enable continuous location tracking for applications such as indoor navigation. If using the existing Wi-Fi scanning functions for continuous location sensing, the Wi-Fi scan alone can consume power in 50 mW to 200 mW range and the Wi-Fi scan delay can also limit the location fix latency.

In accordance with embodiments, an optimized Wi-Fi scan scheme specifically for location sensing purposes is provided. By leveraging the channel and beacon timing information of nearby APs from previous Wi-Fi scans and existing Wi-Fi fingerprint databases, the scanning behavior of the Wi-Fi radio may be optimized to reduce the Wi-Fi radio's active RX/TX time and beacon RX power to save overall power consumption and delay. In these embodiments, one or more of the following principles may be used to optimize Wi-Fi scan scheduling:

- In areas with dense Wi-Fi AP deployment, a partial scan may be used to identify a few strong APs (>10 APs) may be sufficient to reach good location accuracy.
- Most Wi-Fi APs reside on channel 1, 6 and 11 on the 2.4 GHz band.
- Previous Wi-Fi scans may provide timing information for beacon packets, and the device only needs to wake up at the specific beacon timing in subsequent scans.
- A Wi-Fi fingerprint database may be used to provide prior knowledge on the APs' current channel and rough power levels in each indoor area.
- For Wi-Fi APs with strong signal strength, the Wi-Fi device may adaptively set the RX state to save power while still able to compute correct RSSI.

Using a combination of the above principles, some of the embodiments disclosed herein may prioritize the Wi-Fi channels to be scanned and adaptively configure the Wi-Fi radio wakeup timing, duration and RX radio state to reduce power consumption.

In these embodiments that use an optimized Wi-Fi scan function, Wi-Fi scan power may be significantly reduced during indoor localization and navigation applications. In some embodiments, more than a 10× power reduction may be achieved compared to some existing Wi-Fi scan functions.

In addition, some embodiments may also reduce the time needed to complete each scan: the scan delay can be reduced by more than 5×. Faster Wi-Fi scan means that the mobile device can achieve more responsive location fixes and/or collect more RSSI samples to achieve better accuracy within a fixed time window.

Figure 2A:
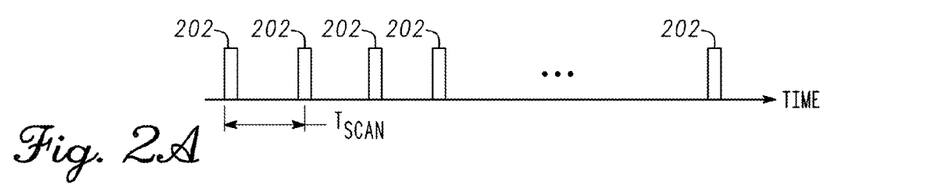
FIG. 2A illustrates conventional Wi-Fi scanning.

There are two existing Wi-Fi scan modes: active or passive mode. During the passive Wi-Fi scan, the client Wi-Fi device listens for all AP beacons on each Wi-Fi channel for a fixed amount of time (e.g., $t_{passive}$=100 ms). In the active scan, the client Wi-Fi device sends an explicit probing request packet on each channel, and then waits for a fixed amount of time (e.g., $t_{active}$=30 ms) to receive the probing replies returned by the APs on the current channel. If using the existing Wi-Fi scan function for location sensing, the mobile devices would need to perform full a channel scan periodically (e.g., at times 202) (illustrated in FIG. 2A) to get continuous location fixes. For example, the mobile device may need location update once every second ($T_{scan}$=1 s) for indoor navigation at pedestrian speed.

There are five physical power states for Wi-Fi radios: Off, Sleep, Listen, Receive and Transmit. In some examples, $P_{sleep}$, $P_{idle}$, $P_{RX}$ and $P_{TX}$ may be used to indicate the power at each state. In the following analysis, some typical power numbers for an off-the-shelf Wi-Fi radio are used: TX power $P_{TX}$=400 mW, RX power $P_{RX}$=213 mW, Idle RX power $P_{Idle}$=188 mW, sleep power $P_{sleep}$=0.013 mw. $T_{probe}$ (~1 ms) may be used to denote the time needed to transmit a probing request packet (computed using typical probing packet size 100 B at 1 Mbps base rate).

To estimate the average power consumption for indoor navigation, the device may scan only for 2.4 GHz channels, and there are 11 Wi-Fi channels to be scanned (N=11). The power consumed with full Wi-Fi scan can be estimated as:

Active scan: $P_{scan}=(P_{TX} \times t_{probe}+P_{Idle} \times t_{active}) \times N/T_{scan}$=66 mW Passive scan: $P_{scan}=P_{Idle} \times t_{passive} \times N/T_{scan}$=207 mW.

In either mode, the Wi-Fi scan may consume power >50 mW, which creates noticeable impact to device battery life.

To reduce the power consumption, embodiments disclosed herein leverage the predictability of nearby APs' power levels and beacon timing. In continuous location sensing usages, the neighbor AP set doesn't change often from scan to scan. Therefore a mobile device 102 can learn the channel, beacon timing and rough signal strength level of nearby APs 104 from the previous full-channel scan, and the Wi-Fi radio may only needs to listen for these APs' beacons at the precise timing and channel to save RX time, and configure the appropriate RX sensitivity to save beacon RX power. The high-power complete Wi-Fi scan then only need to run at a much lower frequency (for example, once the users moves outside of a predefined distance or once certain number of previous APs have disappeared).

Figure 2B:
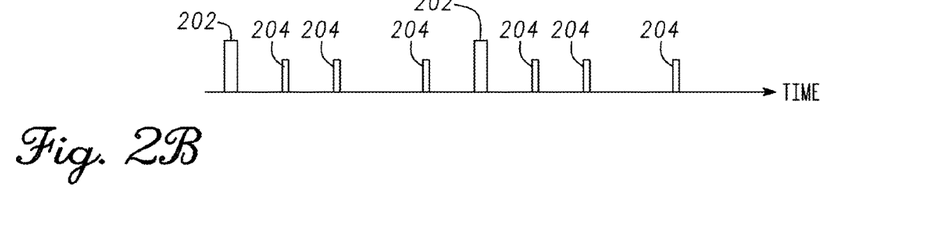
FIG. 2B illustrates Wi-Fi scanning optimized for continuous indoor location sensing in accordance with some embodiments.

Following this principle, embodiments disclosed herein provide for a hybrid active/passive scan mode that combines an infrequent full AP scan (e.g., at times 202) with frequent RSSI update (e.g., at times 204), illustrated in FIG. 2B.

Full AP Scan: After entering the location sensing mode, the client Wi-Fi device (e.g., mobile station 102) first performs a full Wi-Fi active scan to find the full Wi-Fi AP list. Then, it queries for the existing Wi-Fi fingerprint database to identify the current location and the nearby AP list with their channel information. Based on the number of APs on each channel, the Wi-Fi device can build a prioritized channel list. For example, since most 2.4 GHz Wi-Fi APs reside on channel 1, 6 and 11. Scanning these 3 channels can be sufficient for location sensing purposes at the current indoor venue. The Wi-Fi fingerprint database may be stored on a central server that is accessible to the mobile station, may be stored locally at the indoor venue, or may be stored in one or more of the local access points.

RSSI Update: The AP beacon timing and channel information is learned from full AP scan from either beacon or probe response packets, so the Wi-Fi radio only need to switch to the AP's channel and wakes up to receive beacon packets for each AP, and stay in the sleep mode otherwise. When receiving a specific AP's beacon packets, since it's rough power-level can be predicted, the radio can configure the RX sensitivity to further save beacon receiving power consumption (lower sensitivity/amplifier leads to lower RX power consumption).

In some embodiments, the average power consumption may be estimated for both Full AP scan and RSSI Update. For full AP scan, channels 1, 6, 11 on 2.4 G band (N=3) may provide a sufficient number of APs for location sensing, and the full AP scan happens once every $T_{scan}$ (30 s) on average (specific number subject to user mobility). The average power consumption may be estimated as follows:

$P_{scan}=(P_{TX} \times t_{probe}+P_{Idle} \times t_{active}) \times N/T_{scan}$=0.6 mW.

For an RSSI update on selected APs, (e.g., the M strongest APs (e.g., M=15)). The client device may be configured to wake up every $T_{update}$ (e.g., 1 s) to get beacons from M APs to update their RSSIs for location sensing. The wake up time is $T_{wake}$ (e.g., 2 ms) and the wake up power consumption is $P_{switch}$ (e.g., 30 mW). Knowing beacon timing, the device may be configured to listen only for $\Delta t$ for each beacon ($\Delta t$ accounts for beacon delay due to clock drift, e.g., 1 ms). For example:

$P_{update}=(P_{RX} \times \Delta t+P_{switch} \times T_{wake}) \times M/T_{update}+P_{sleep} \times (T_{update}-(\Delta t+T_{wake}) \times M)/T_{update}$=4.1 mW Therefor the total power is $P=P_{scan}+P_{update}$=4.7 mW, which is more than 10 times lower than using the standard Wi-Fi scan function.

If an adaptive RX state (sensitivity) feature is available on the Wi-Fi radio (e.g., a lower power Wi-Fi radio), the RSSI update power consumption may be further reduced by 20-30%, which leads to around 20% further reduction to the overall power consumption.

In accordance with some embodiments, the mobile station 102 may be arranged to determine access points 104 for use for location references. In these embodiments, the mobile station 102 may be arranged to rank channels, based on the number of access points detected on each channel, identify a group of the access points operating on a particular set of the ranked channels, and determine timing and channel predictions for beacons from each of the identified access points of the group. The mobile station 102 may also be arranged to wake-up from a low-power state to receive the beacons on predicted channels at predicted times based on the timing and channel predictions an update received signal strength indicators (RSSIs) for each access point, based on signal strengths of the beacons. The mobile station 102 may also be arranged to update an indoor location based on the RSSIs and known locations of the access points in the group.

In some embodiments, prior to ranking the channels, the mobile station 102 may be arranged to identifying channels, beacon timing and rough signal strength levels of nearby access points from a previous full-channel scan. In some embodiments, prior to ranking the channels, the mobile station may also be arranged to identify channels, beacon timing and rough signal strength levels of nearby access points from a Wi-Fi fingerprint database. In these embodiments, the Wi-Fi fingerprint database may be a radio map for the area of interest that can be used to infer user location. The Wi-Fi fingerprint database may contain a collection of pre-recorded Wi-Fi scan and location pairs, where each scan corresponds to the signal strength of the observed Wi-Fi APs at the corresponding location.

In some embodiments, the mobile station 102 may also be arranged to enter an indoor sensing mode (e.g., after entering an indoor venue) and perform a full Wi-Fi active scan after entering the indoor sensing mode to detect the access point on the channels for use in ranking the channels. The mobile station 102 may also be arranged to perform a separate Wi-Fi scan for location sensing, the scan comprising an active Wi-Fi scan on the ranked channels.

In some embodiments, the mobile station 102 may also be arranged to refrain from performing a full scan until after the mobile station moves a predetermined distance or a number of the AP are no longer available. In some embodiments, the mobile station 102 and the access points 104 operate in accordance with an IEEE 802.11 standard.

In some embodiments, the mobile station 102 may be arranged for determining access points 104 for use for location references. In these embodiments, the mobile station may be arranged to identify channels, beacon timing and rough signal strength levels of nearby access points (APs) from at least one of a previous full-channel scan or a Wi-Fi fingerprint database. The mobile station 102 may configure receiver sensitivity based on the rough signal strength levels for receipt of subsequent beacons and may wake-up from a low-power state to receive beacons for the nearby access points on the identified channels at times based on the identified beacon timing. In these embodiments, the mobile station 102 may use RSSI levels of the received beacons for location determination.

In some of these embodiments, the mobile station 102 may be arranged to rank the identified channels, based on the number of access points detected on each channel and identify a group of access points operating on a particular set of ranked channels. In some of these embodiments, the mobile station 102 may be arranged to update location information for each access point, based on the RSSIs of the beacons and update an indoor location based on the RSSIs and known locations of the access points in the group.

Figure 3:
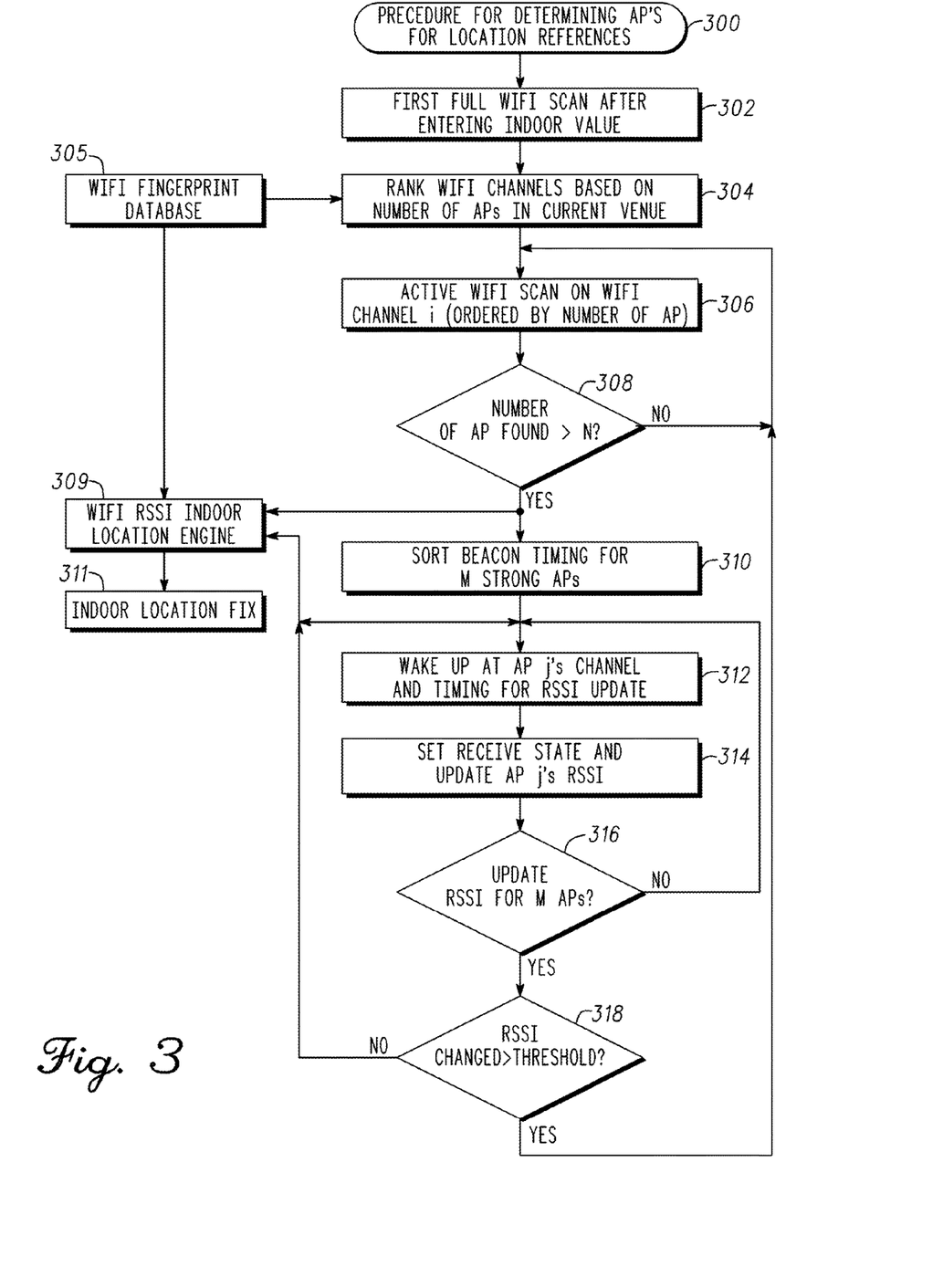
FIG. 3 is a procedure for determining access points for use as location references in accordance with some embodiments.

FIG. 3 is a procedure for determining access points for use as location references in accordance with some embodiments. Procedure 300 may be performed by a mobile station, such as mobile station 102 (FIG. 1), although this is not a requirement.

Operation 302 comprises performing a full Wi-Fi scan after entering an indoor sensing mode (e.g., after entering an indoor venue).

Operation 304 comprises ranking channels, based on the number of access points detected on each channel. In some embodiments, operation 304 may comprise identifying channels, beacon timing and rough signal strength levels of nearby access points (APs) from a previous full-channel scan. In some embodiments, operation 304 may comprise identifying channels, beacon timing and rough signal strength levels of nearby access points (APs) from a Wi-Fi fingerprint database.

Operations 306 and 308 comprise performing, for each identified access point (N), an active Wi-Fi scan on the ranked channels.

In operation 309, a Wi-Fi location engine may be used to determine the location of the mobile station based on the RSSIs of the access points.

Operation 310 comprises sorting beacon timing for the M strongest access points.

Operation 312 comprises waking up based on the beacon timing for a current access point for an RSSI update.

Operation 314 comprises setting the receive state and updating the RSSI for the current access point.

Operation 316 determines if an RSSI update has been performed for each of the access points.

Operation 318 determines if the RSSI threshold for location determination is to be changed. When the RSSI threshold is changed, operations 306-318 may be repeated. Otherwise, the RSSI information for the access points may be used for indoor location determination in operation 309 to provide an indoor location fix at operation 311.

Figure 4:
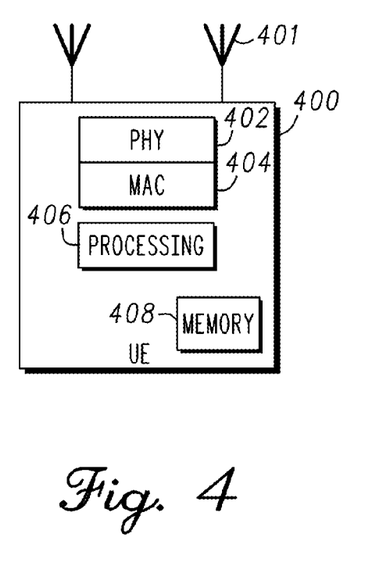
FIG. 4 is a block diagram of a mobile station in accordance with some embodiments.

FIG. 4 is a block diagram of a mobile station (STA) in accordance with some embodiments. The STA 400 may include physical layer circuitry 402 for transmitting and receiving signals to and from AP 104 (FIG. 1) using one or more antennas 401. STA 400 may also include medium access control layer (MAC) circuitry 404 for controlling access to the wireless medium. STA 400 may also include processing circuitry 406 and memory 408 arranged to perform the operations described herein.

In some embodiments, the STA 400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the STA 400 may include one or more of a keyboard, a display, a non-volatile memory port, multiple antennas, a graphics processor, an application processor, speakers, and other mobile device elements. The display may be an LCD screen including a touch screen.

The one or more antennas 401 utilized by the STA 400 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to 1/10 of a wavelength or more.

Although the STA 400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

In the description, numerous specific details are set forth. However, it is understood that embodiments of the invention may be practiced without these specific details. In other instances, well-known circuits, structures and techniques have not been shown in detail in order not to obscure an understanding of this description. References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "wireless" may be used to describe circuits, devices, systems, methods, techniques, communications channels, etc., that communicate data by using modulated electromagnetic radiation through a non-solid medium. A wireless device may comprise at least one antenna, at least one radio, at least one memory, and at least one processor, where the radio(s) transmits signals through the antenna that represent data and receives signals through the antenna that represent data, while the processor(s) may process the data to be transmitted and the data that has been received. The processor(s) may also process other data which is neither transmitted nor received.

As used within this document, the term "network controller" is intended to cover devices that schedule and control, at least partially, wireless communications by other devices in the network. A network controller may also be known as a base station (BS), access point (AP), central point (CP), or any other term that may arise to describe the functionality of a network controller.

As used within this document, the term "mobile device" is intended to cover those devices whose wireless communications are at least partially scheduled and controlled by the network controller. A mobile device (MD) may also be known as a mobile station (MS), STA, subscriber station (SS), user equipment (UE), or any other term that may arise to describe the functionality of a mobile device. Mobile devices may move during communications, but movement is not required.

As used within this document, the term "communicate" is intended to include transmitting and/or receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed.

As used within this document, the term "scan" refers to listening for a beacon or probe response that identifies the sender, with the intent of acquiring the channel and timing at which future beacons will be transmitted by that sender. Most scans will involve listening to more than one channel. Most scans will listen on each channel long enough to identify more than one sender, if they are present.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method performed by a mobile station (STA) for determining access points for use for location references, the method comprising:
performing a scan over a plurality of channels;
ranking the plurality of channels, based on a number of access points detected on each channel;
identifying a group of the access points operating on a subset of the plurality of channels based on the ranking of the channels;
determining timing and channel predictions for beacons from each of the identified access points of the group;
waking from a low-power state to receive the beacons on predicted channels at predicted times based on the timing and channel predictions;
updating received signal strength indicators (RSSIs) for each access point, based on signal strengths of the beacons; and
updating an indoor location based on the RSSIs and known locations of the access points in the group.

2. The method of claim 1 further comprising, prior to ranking the channels, identifying channels, beacon timing and rough signal strength levels of nearby access points from a previous full-channel scan.

3. The method of claim 2 further comprising, prior to ranking the channels, identifying channels, beacon timing and rough signal strength levels of nearby access points from a Wi-Fi fingerprint database.

4. The method of claim 1 further comprising:
entering an indoor sensing mode;
performing a full Wi-Fi active scan after entering the indoor sensing mode to detect the access point on the channels for use in ranking the channels, and
performing a separate Wi-Fi scan for location sensing, the scan comprising an active Wi-Fi scan on the ranked channels.

5. The method of claim 4 further comprising refraining from performing a full scan until after the mobile station moves a predetermined distance or a number of the AP are no longer available.

6. The method of claim 4 wherein the mobile station and the access points operate in accordance with an IEEE 802.11 standard.

7. A method performed by a mobile station (STA) for determining access points for use for location references, the method comprising:
identifying channels, beacon timing and rough signal strength levels of nearby access points (APs) from at least one of a previous full-channel scan or a Wi-Fi fingerprint database;
configuring receiver sensitivity based on the rough signal strength levels for receipt of subsequent beacons;
waking-up from a low-power state to receive beacons for the nearby access points on the identified channels at times based on the identified beacon timing; and
using received signal strength indicators (RSSIs) levels of the received beacons for location determination.

8. The method of claim 7 further comprising:
ranking the identified channels, based on the number of access points detected on each channel; and
identifying a group of access points operating on a particular set of ranked channels.

9. The method of claim 8 further comprising updating an indoor location based on the RSSIs and known locations of the access points in the group.

10. A mobile station (STA) configured for determining access points for use for location references, the STA comprising processing circuitry and a transceiver arranged to:
identify channels, beacon timing and rough signal strength levels of nearby access points (APs) from at least one of a previous full-channel scan or a Wi-Fi fingerprint database;
configure receiver sensitivity based on the rough signal strength levels for receipt of subsequent beacons;
wake-up from a low-power state to receive beacons for the nearby access points on the identified channels at times based on the identified beacon timing; and
use received signal strength indicators (RSSIs) levels of the received beacons for location determination.

11. The mobile station of claim 10 wherein the processing circuitry is further arranged to:
rank the identified channels; based on the number of access points detected on each channel; and
identify a group of access points operating on a particular set of ranked channels.

12. The mobile station of claim 11 wherein the processing circuitry is further arranged to update a location of the access points and update an indoor location based on the RSSIs and known locations of the access points in the group.

13. A non-transitory computer-readable storage medium that stores instructions for execution by one or more processors of a mobile station to perform operations for determining access points for use for location references, the operations comprising:
performing a scan over a plurality of channels;
ranking the plurality of channels, based on a number of access points detected on each channel;
identifying a group of the access points operating on a subset of the plurality of channels based on the ranking of the channels;
determining timing and channel predictions for beacons from each of the identified access points of the group;
waking from a low-power state to receive the beacons on predicted channels at predicted times based on the timing and channel predictions;
updating received signal strength indicators (RSSIs) for each access point, based on signal strengths of the beacons; and
updating an indoor location based on the RSSIs and known locations of the access points in the group.

14. The non-transitory computer-readable storage medium of claim 13 wherein the operations further comprise, prior to ranking the channels, identifying channels, beacon timing and rough signal strength levels of nearby access points from a previous full-channel scan.

15. The non-transitory computer-readable storage medium of claim 13 wherein the operations further comprise, prior to ranking the channels, identifying channels, beacon timing and rough signal strength levels of nearby access points from a Wi-Fi fingerprint database.

16. A mobile station (STA) configured for determining access points for use for location references, the STA comprising one or more antennas, processing circuitry and a transceiver arranged to:
   identify, using the one or more antennas, channels, beacon timing and rough signal strength levels of nearby access points (APs) from at least one of a previous full-channel scan or a Wi-Fi fingerprint database;
   configure receiver sensitivity based on the rough signal strength levels for receipt of subsequent beacons;
   wake-up from a low-power state to receive beacons for the nearby access points on the identified channels at times based on the identified beacon timing; and
   use received signal strength indicators (RSSIs) levels of the received beacons for location determination.

17. The mobile station of claim 16 wherein the processing circuitry is further arranged to:
   rank the identified channels, based on the number of access points detected on each channel; and
   identify a group of access points operating on a particular set of ranked channels.

* * * * *

UNITED STATES PATENT AND TRADEMARK OFFICE
CERTIFICATE OF CORRECTION

PATENT NO. : 9,877,158 B2  
APPLICATION NO. : 15/026636  
DATED : January 23, 2018  
INVENTOR(S) : Yang et al.

Page 1 of 1

It is certified that error appears in the above-identified patent and that said Letters Patent is hereby corrected as shown below:

In the Claims

In Column 10, Line 34, in Claim 11, delete "channels;" and insert --channels,-- therefor Signed and Sealed this
Fourth Day of June, 2019

Andrei Iancu
*Director of the United States Patent and Trademark Office*